United States Patent
Van Brocklin et al.

(10) Patent No.: US 7,577,063 B2
(45) Date of Patent: Aug. 18, 2009

(54) CALIBRATION OF A FOCUS OFFSET IN AN OPTICAL DRIVE

(75) Inventors: Andrew L. Van Brocklin, Corvallis, OR (US); D. Mitchel Hanks, Ft. Collins, CO (US); Greg J. Lipinski, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1037 days.

(21) Appl. No.: 11/027,855

(22) Filed: Dec. 30, 2004

(65) Prior Publication Data

US 2006/0146663 A1    Jul. 6, 2006

(51) Int. Cl.
*G11B 7/00* (2006.01)
*G11B 7/24* (2006.01)

(52) U.S. Cl. .............. 369/44.25; 369/44.26; 369/44.27; 369/53.23; 369/275.1

(58) Field of Classification Search ........... None
See application file for complete search history.

(56) References Cited

U.S. PATENT DOCUMENTS

| | | | |
|---|---|---|---|
| 5,541,900 A | | 7/1996 | Ito et al. |
| 5,574,706 A | * | 11/1996 | Verboom et al. ......... 369/44.26 |
| 5,831,952 A | | 11/1998 | Yamada et al. |
| 2003/0193864 A1 | | 10/2003 | Pate |
| 2004/0004912 A1 | | 1/2004 | Morishima |

FOREIGN PATENT DOCUMENTS

EP    1503573    2/2005

OTHER PUBLICATIONS

International Search Report (PCT/US2005/038402), dated Mar. 30, 2006.

* cited by examiner

*Primary Examiner*—Muhammad N. Edun

(57) ABSTRACT

Calibration of a focus offset in an optical drive. A calibration pattern, comprising a plurality of marked areas, is marked upon a medium. A user input is received, identifying a perceived darkest marked area of the calibration pattern. The focus offset is determined corresponding to the perceived darkest marked area.

38 Claims, 5 Drawing Sheets

CALIBRATION OF A FOCUS OFFSET IN AN OPTICAL DRIVE

BACKGROUND

Low power lasers are used to read and write data on the data side of optical media, such as compact discs (CDs), digital versatile discs (DVDs), and the like. Typically, a laser beam writes various types of data on a data side of a disc while the disc is rotating. Data may be recorded by making marks on the disc, representing binary digits. Various data writing strategies have been employed to create desirably shaped marks that are precisely positioned and that have sharp edges to enable detection.

Labels on such optical discs are typically used to provide descriptive human-readable indicia of the data content recorded on the disc, as well as illustrations, artwork, and the like. Such descriptions and images are generally handwritten, affixed, or marked on the side of the disc opposite the data side. Recently, apparatus and methods have been developed with the ability to generate an image or label on the non-data side (the "label side") of an optical disc using a low power laser, such as the same laser that is employed to read and write digital or electronic data on the data side of the disc. For example, see U.S. Patent Application Publication No. 2003/0108708, Anderson, et al. which is commonly assigned with the present application.

In marking the data side of a disc using a laser in an optical disc drive, high importance is typically placed on creating marks having sizes, shapes, edge sharpness, and placement within precise tolerances that are generally required for accurately reading and writing digital data. However, a comparatively lower degree of precision is required to create marks for producing an image on the label side of the disc that is satisfactory to the visual perception of an unaided human eye. Accordingly, in marking a label side of a disc using a laser in an optical disc drive, it is desirable to optimize the writing process for other considerations, such as enhanced visible reflectivity or optical density of marks.

Conventional optical disc drives have a focusing servo incorporating a focus actuator. The focus actuator moves an objective lens in a Z-axis direction relative to the disc, to generally maintain the lens at a constant optimal focus position, sometimes called "best focus" position. The "best focus" position is typically optimized for reading and writing data on the data side of the disc, such as by selecting a default position where the laser beam is focused on a spot at a layer of recording material below the surface of the data side. The use of a defocused spot for writing disc labels is described by Anderson, et al., in U.S. patent application Ser. No. 10/732,047, filed Dec. 9, 2003, which is commonly assigned with the present application. By defocusing a laser spot size rather than using a focused laser spot, a larger marking spot can be achieved on optically labeled disc media without a sacrifice in speed.

For purposes of such label marking optimization, it may be useful to measure the reflectivity of marks on the label side of the disc. Such measurements may be done, for example, by measuring laser light generated by the writing laser and reflected from the marked surface. However, in marking the label side of the disc, using the technology described in the above-referenced U.S. Patent Application Publication No. 2003/0108708, the chemistry on the label is optimized to absorb as much light as possible at the wavelength of the writing laser beam. As a result, there is very little reflection of light at the frequency of the writing laser, and the change in reflectivity between written and unwritten areas is very small, resulting in a low signal-to-noise ratio in the reflectivity measurement. Accordingly, the use of a writing laser to also generate light for measuring the reflectivity of the written mark may not yield satisfactory results.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
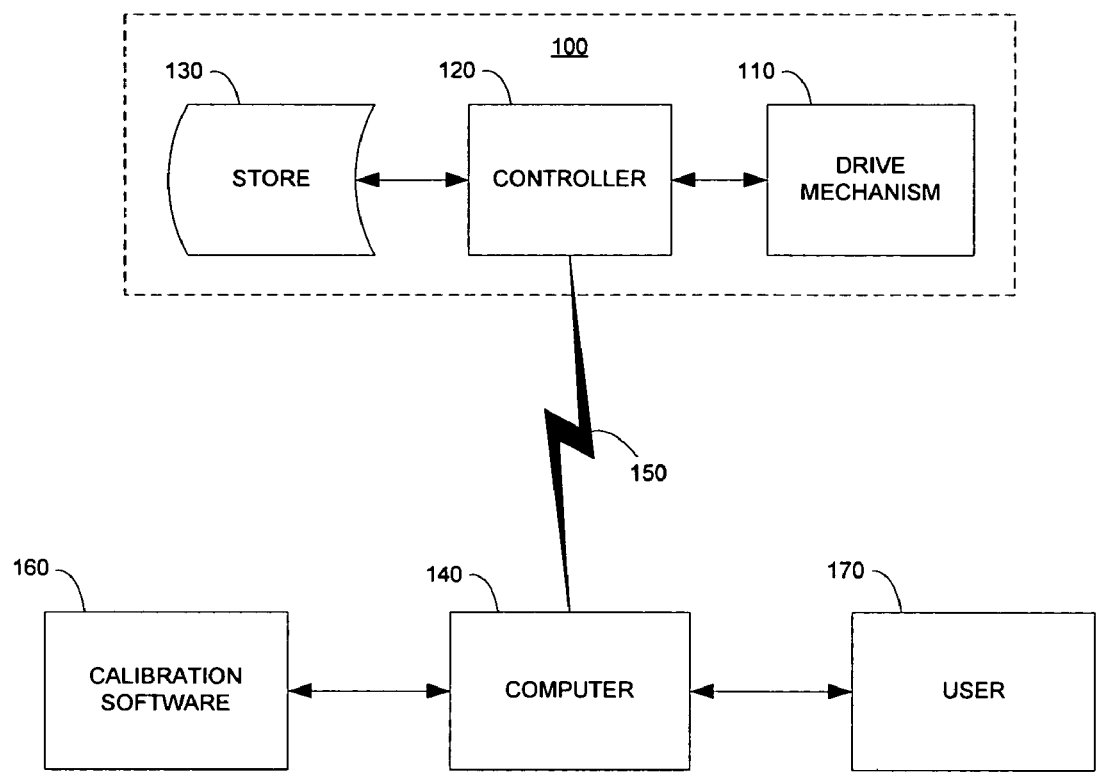
FIG. 1 is a diagram of an exemplary implementation of an optical storage device and calibration system according to an embodiment of the present invention.

User-based focus calibration enables an optical storage device, based on information typically provided by the user, to determine the focus offset to be used for printing of an image on an optical medium. The device prints a calibration pattern on the medium, including a series of marked areas that may be easily seen by the unaided eye of a user. The user then performs a visual assessment of the calibration patterns, selects the best (e.g., perceived darkest) marked area, and is prompted to record the selection. User-based focus calibration may be especially desirable when more fully automatic calibration methods are unreliable, or are not implemented in the optical drive, or are not operating correctly.

Reference will now be made in detail to an embodiment of the present invention, an example of which is illustrated in the accompanying drawings, wherein like reference numerals illustrate corresponding or similar elements throughout the several views.

FIG. 1 depicts an optical drive, such as optical storage device 100, that includes a controller 120 that is able to read information from and write information to a calibration data store 130. The calibration data store 130 may, for example, be a region of non-volatile random access memory (i.e., memory that is protected against loss of power for an extended period of time). The controller 120 controls a drive mechanism 110 for rotating and marking optical media. The drive mechanism 110 is typically able to read and write digital data on the optical media.

The controller 120 is communicatively coupled to a computer 140 by a communications link 150. It is not material whether the storage device 100 is internal or external to the computer 140. The communications link 150 may be any of numerous kinds of links suitable for connecting a peripheral device to a processor of computer 140; for example, a bus (such as PCI), a USB or Firewire link, Fibre Channel, a wired or wireless network connection, and the like. The communications link 150 may be used for transmitting data and instructions between the computer 140 and the device 100, such as data that has been read from the optical media, or that is to be recorded on the optical media.

An exemplary computer 140 is configured with input and output devices, not shown, for communicating with a human user 170. In a typical configuration, such devices may include a display, keyboard, and mouse. The exemplary computer 140 is also configured with an operating system able to run applications such as calibration software 160.

Calibration software 160 includes instructions for communicating user-based focus calibration information from the user 170 to the controller 120. Calibration software 160 may be a utility software application able to interact with the user 170 and exchange information with the controller 120.

In one implementation, the calibration software 160 may be included in a setup or installation software application associated with the device 100. In another implementation, the computer 140 may be able to launch execution of the calibration software 160 responsively to instructions received from the controller 120. In an illustrative example, the computer 140 may be adapted to run a driver, such as a driver for exchanging data with the controller 120, that is able to initiate execution of the calibration software 160 at the direction of the controller 120. The controller 120 is able to execute instructions in response to information received from the computer 140. Exemplary instructions may include steps for interacting with the calibration software 160, for accessing the calibration data store 130, and for controlling the drive mechanism 110 responsively to information exchanged over communications link 150 with the calibration software 160 and the user 170. Such instructions to the controller 120 may, for example, be located in firmware 232 or may be received by the controller 120 from the computer 140.

Calibration information received from the user 170, and/or calibration data directly or indirectly derived therefrom (such as a focus offset value), may be stored by the controller 120 in calibration data store 130. The calibration data store 130 may, for example, contain calibration data for a focus offset. If valid calibration data has not been stored, the calibration data store 130 may contain a marker, flag, uninitialized data, or other information that the controller 120 is configured to recognize as an indication that valid calibration data has not been stored.

Figure 2:
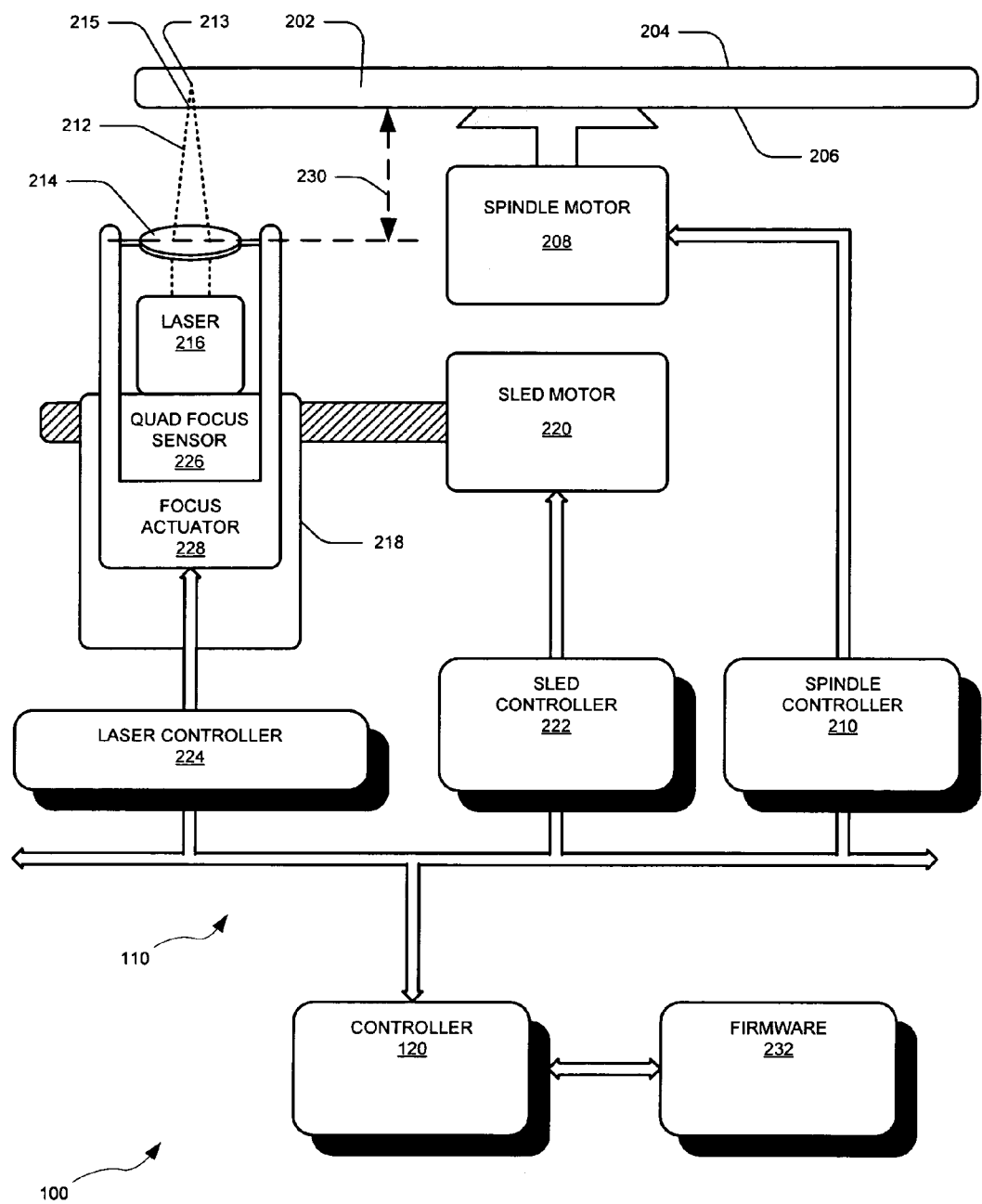
FIG. 2 is a diagram illustrating an exemplary optical storage device according to an embodiment of the present invention.

FIG. 2 is a diagrammatic illustration of an exemplary optical storage device 100. The drive mechanism 110 operates under the direction of the controller 120. The controller 120 is configured to execute program statements such as those contained in firmware 232.

A disc 202 having a data side 204 is oriented (as shown) to position the label side 206 for marking. The disc 202 is rotated and marked by the drive mechanism 110. More specifically, the disc 202 is rotated by a spindle motor 208, which is controlled by a spindle controller 210. A laser 216 is carried by a sled 218, which is moved in a radial direction by the sled motor 220. In a typical application, a sled controller 222 directs the sled motor 220 to advance the sled 218, carrying the laser 216, in incremental steps from a radially inner edge of a label region of the label side 206 to a radially outer edge of the label region. The laser 216 generates an optical beam such as laser beam 212. The laser beam 212 passes through optics, such as objective lens 214. The objective lens 214 is shown positioned at an exemplary working distance 230 from the surface of the label side 206 of the disc 202. At the exemplary working distance 230 illustrated in FIG. 2, the objective lens 214 focuses the laser beam 212 upon a point beneath the surface of the label side 206 of the disc 202, such as focal point 213. Accordingly, when the laser beam 212 strikes the coated surface of the label side 206, the laser beam 212 is not in focus, creating an irradiated spot 215 upon the surface of the label side 206 that is generally oval or circular, and larger than the focal point 213.

A laser controller 224 controls the operation of the laser 216 and associated tracking coils and sensors. In the example of FIG. 2, a quad focus sensor 226 typically contains four sensors, and is designed to facilitate focusing generally, such as by providing data for determining the distance between the laser 216 and the disc 202. The quad focus sensor 226 does not directly sense the distance between laser 216 and disc 202, but instead senses the amount of reflected light from the disc 202. The amount of reflected light is indicative of the size of the irradiated area where the laser beam 212 contacts the surface of the disc 202. In some implementations, the quad focus sensor 226 is adapted for use with optics (such as objective lens 214) that focus through the clear polycarbonate substrate typically used to cover a data recording layer of the disc 202; accordingly, the quad focus sensor 226 may be less accurate for writing on a label side 206, due to the fact that the optics 214 are focusing only through air.

The focus actuator 228 is configured to adjust the working distance 230 by moving optics such as the objective lens 214, so that the laser beam 212 may be focused on a focal point 213 at a position that may be at, above, or beneath the surface of the disc 202. The focus actuator 228 may include a voice coil for moving the objective lens 214, and the working distance 230 may be adjusted by varying a voltage applied to the focus actuator 228.

Figure 3A:
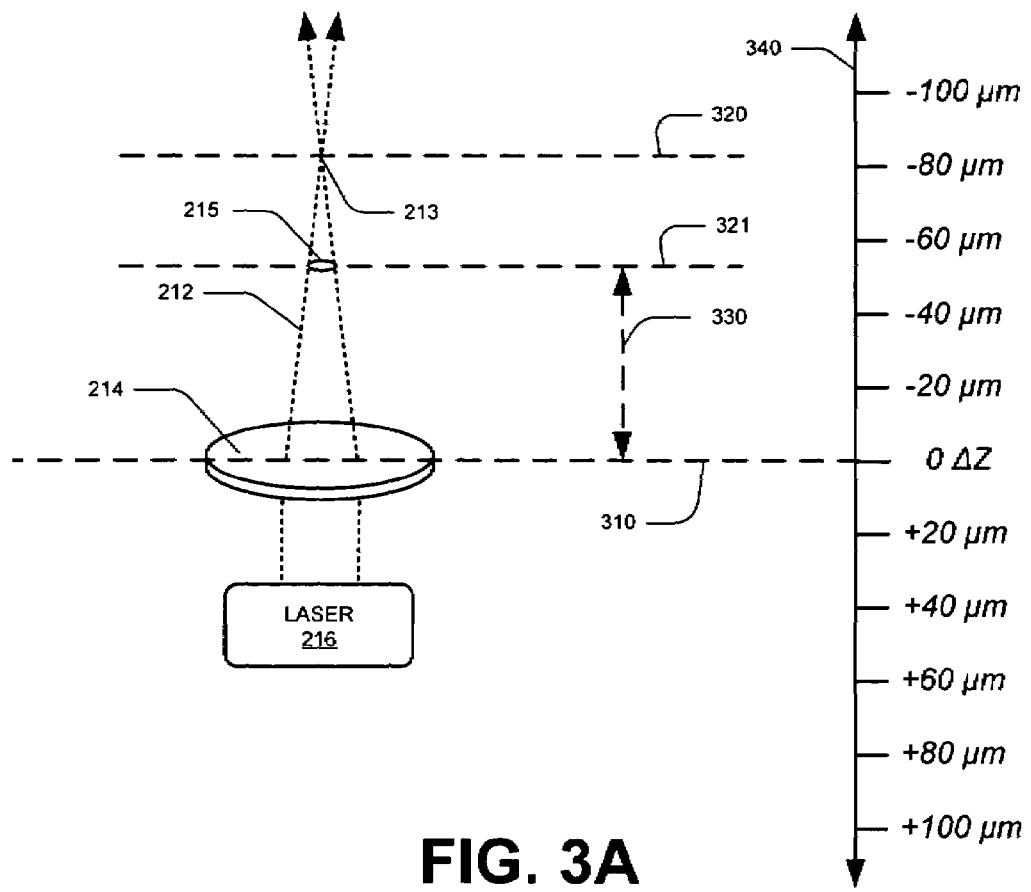
FIG. 3A is a diagram illustrating an exemplary working distance and focus offset according to an embodiment of the present invention.

FIG. 3A illustrates a working distance 330 and focus offset 340 according to an embodiment of the present invention.

Optimal focus 310 is a Z-axis position of the optics (such as the objective lens 214) that causes the laser beam 212 to be focused at a focal point 213 that falls upon the plane of a default focal position 320. The default focal position 320 may be at, above, or beneath the surface of the disc 202, as desired. In the illustrated example, the default focal position 320 for writing data to the data side of the disc 202 may be at a recording layer of the disc 202 (i.e., a polycarbonate-to-data layer interface), beneath the surface of the disc 202.

The working distance 330 is the distance from the objective lens 214 to the surface of the label side 206 of the disc 202. The working distance 330 varies as the focus offset 340 is adjusted. In the illustrated example, reference line 321 illustrates the surface plane of the label side 206 of the disc 202.

The focus offset 340 represents a delta-Z ($\Delta Z$) relative to the optimal focus 310. When the focus offset 340 is zero, the objective lens 214 is at optimal focus 310 (as shown); therefore, the laser beam 212 produces a narrowly focused irradiated spot 215 at the focal point 213. By applying a positive or negative focus offset 340 to the optimal focus 310, the objective lens 214 is moved up or down on the Z-axis, and the working distance 330 becomes correspondingly shorter or longer. The application of positive or negative focus offset 340 results in focusing and defocusing of the irradiated spot 215 on the surface of label side 206 of the disc 202. As depicted, negative values of focus offset 340 typically represent distances closer to the disc 202, and positive values of focus offset 340 typically represent distances further away from the disc 202; however, alternate implementations may use the opposite sign convention if desired.

In some embodiments, optimal focus 310 is the position where a maximum amount of light from laser beam 212 is reflected back to quad focus sensor 226. In other embodiments, optimal focus 310 may be selected by designers of the device 100; for example, to optimally focus the laser beam 212 on a focal point 213 at a surface of the data side 204 of disc 202 (i.e., an air-to-polycarbonate interface), or at a recording layer of the disc 202 (i.e., a polycarbonate-to-data layer interface), as may be desired. For printing on a label side 206 of the disc 202, a desirable optimal focus 310 may be at a surface of the label side 206 of disc 202 that forms an air-to-label interface; in other words, optimal focus 310 will be the position where the laser beam 212 produces a focal point 213 at the air-to-label interface.

In order to maintain the objective lens 214 at a particular position with respect to the disc 202, the position of the lens 214 may actually need to move up and down in order to match up and down mechanical movement of the disc 202 (i.e., on a Z-axis). This variation in the objective lens position may be determined, for example, by a conventional mapping process applied to the disc 202 (for example, upon insertion of disc 202) that yields voltages for driving the focus actuator 228 to maintain the objective lens 214 at a substantially constant distance from the disc 202 as the disc 202 rotates, compensating for possible warping or other irregularities of the disc 202. For example, one conventional technique for maintaining the objective lens 214 at a particular position with respect to the disc 202 includes moving the focus actuator 228 up and down by applying a sinusoidal pattern of focus offsets 340, and using peak voltage information obtained by the sum of the four sensors of quad focus sensor 226 while the disc 202 rotates, in order to determine the optimal focus 310 at a given rotational angle of the disc 202.

Figure 3B:
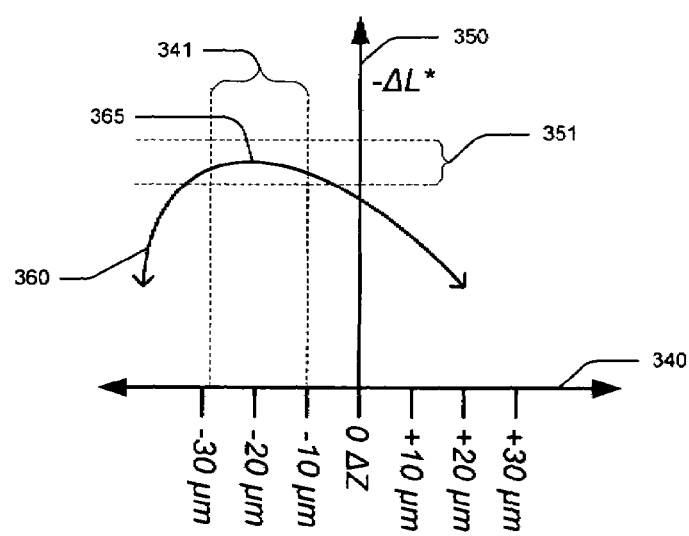
FIG. 3B is a graph depicting a typical relationship between focus offset and human-perceived darkness in an embodiment of the present invention.

FIG. 3B is a graph depicting a curve 360 of a typical relationship between focus offset 340 and human-perceived darkness 350 of a marked area on the label side 206 of disc 202. The curve 360 may vary based on numerous factors, including, for example, the composition of a laser-markable coating on the label side 206, the substrate that the coating is on, the media type (e.g., CD, DVD, or other forms of media), the linear or rotational velocity of the disc 202, and the power of the laser 216. However, as shown in the illustrated embodiment of the invention, human-perceived darkness 350 generally reaches a peak 365 on the curve 360 at a negative value of focus offset 340.

Darkness, as perceived by the user 170, may be related to a physical measurement of optical density, but the relationship is generally not exact. Human-perceived darkness 350 may be expressed in conventional L* units, which are a measure of human-visible reflectivity. L* values may be expressed as percentages ranging from 0% (completely nonreflective) to 100% (completely reflective). A change from a lighter to a darker value may be expressed as a negative delta-L* (−ΔL*), and a change from a darker to a lighter value may be expressed as a positive delta-L* (+ΔL*).

In an implementation of one embodiment of the invention, exemplary focus offsets 340 in the range from −128 micrometers (μm) to +127 μm have been tested. In this implementation, focus offsets 340 in the offset range 341 from −29 μm to −10 μm have been found generally to produce markings within an acceptable darkness range 351 as perceived by exemplary users 170. The acceptable darkness range 351, in this implementation, has been found generally to span approximately three L* units; that is, to vary within a range of plus or minus 1.5 L* units from the peak 365 of the curve 360, as viewed by exemplary users 170. Note that these exemplary focus offset 340 ranges are appropriate for an optical storage device 100 that is designed for use as a CD writer. An optical storage device 100 designed for DVD writing has been observed to have optimal focus offset 340 ranges from −10 μm to +70 μm. The optics that are used (i.e., whether the optics are optimized for DVD or CD or other formats) have an influence on the desired focus offset 340 from the optimal focus 310.

Figure 4A:
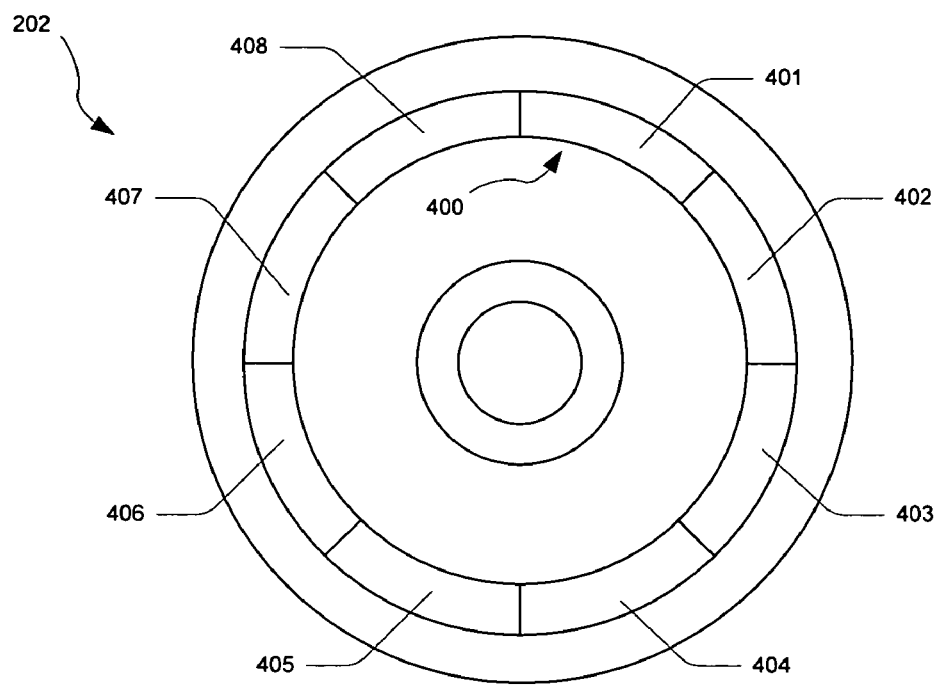
FIG. 4A is a depiction of an exemplary calibration pattern illustrating multiple focus offsets according to an embodiment of the present invention.

FIG. 4A is a depiction of an exemplary calibration pattern 400 illustrating multiple focus offsets 340 according to an embodiment of the present invention. An exemplary calibration pattern 400 may generally include two to twenty marked areas, such as marked areas 401-408 shown in the illustration. Each of the marked areas 401-408 may be produced at a focus offset 340 that differs for adjacent pairs of marked areas 401-408. For example, a series of marked areas 401-408 representing focus offsets 340 in a range from −80 μm to +10 μm may be typical.

In the illustrative calibration pattern 400 of FIG. 4A, the eight marked areas 401-408 are arranged in an annular configuration on the label side 206 of disc 202. An exemplary radial width for the annular configuration of calibration pattern 400 would be about one centimeter. The exemplary calibration pattern 400 may be produced at focus offsets 340, respectively, of −60 μm for marked area 401, −50 μm for marked area 402, −40 μm for marked area 403, −30 μm for marked area 404, −20 μm for marked area 405, −10 μm for marked area 406, 0 μm for marked area 407, and +10 μm for marked area 408.

As will be apparent to one skilled in the art, numerous other configurations of calibration pattern 400 and gradations of focus offset 340 are possible. For example, the adjacent marked areas 401-408 need not complete an annulus on the surface of disc 202, but may instead describe an arc, a rectangle, or any of numerous other shapes. Interfaces between adjacent pairs of marked areas 401-408 may be a straight or substantially straight line of demarcation, or may, for example, comprise curves, zigzags, sawtooth patterns, stripes, interlocking combs, blank space, or any of numerous other patterns or arrangements that may be helpful to the user 170 in visually comparing and contrasting the darkness of adjacent pairs of marked areas 401-408.

The marked areas 401-408 generally are marked in a solid fill pattern, intending to provide maximum contrast with unmarked areas of the surface of disc 202. However, it may in some implementations be desirable to use partial fills, crosshatching, or other patterns.

Within or adjacent to each of the marked areas 401-408 on the label side 206, a tag (such as a label or indicative mark, not shown) may be marked to permit the user 170 to identify the marked area to the calibration software 160. The tag may include the actual numeric value of the focus offset 340, or may be another form of identifier, such as a number or letter, a descriptive string of one or more characters, or some other symbol or unique indicator pattern. The tag may have a font and size that are selected for ease of readability by the user 170.

Figure 4B:
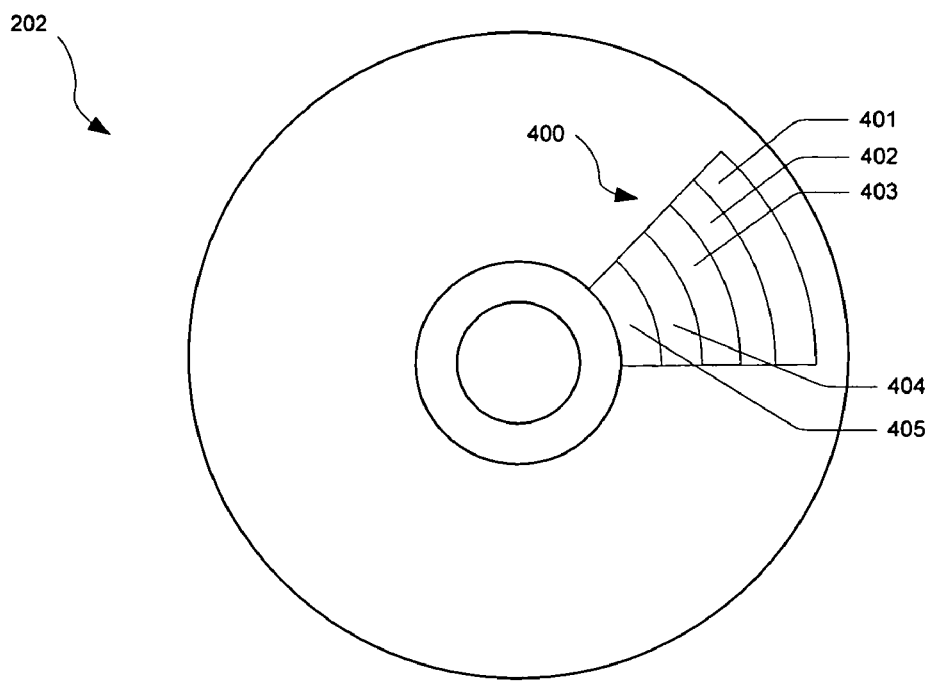
FIG. 4B is a depiction of an alternate exemplary calibration pattern according to a further embodiment of the present invention.

FIG. 4B is a depiction of an alternate exemplary calibration pattern 400 according to a further embodiment of the present invention. In this illustrative example, marked areas 401-405 are arranged in an arcuate configuration as concentric arcs, or slices of concentric annular rings. In one implementation, each of the marked areas 401-405 may be produced at a focus offset 340 that differs for adjacent pairs of marked areas 401-405. In other implementations, one or more of the marked areas 401-405 may include one or more marked sub-areas having varying focus offsets 340.

It may be desirable to obtain a visual assessment from the user 170 of the darkness of marked areas 401-405 at a plurality of linear velocities as the disc 202 is rotated by the spindle motor 208. Multiple concentric arcs (such as marked areas 401-405) or multiple concentric rings may be marked, at varying linear velocities, with the tracks per inch (TPI) of the drive mechanism 110 scaled to represent what the device 100 calculates or estimates to be a similar darkness. Such calculation or estimation may be performed by the controller 120, and may be based on the generally applicable assumption that darkness scales linearly with TPI.

Figure 5:
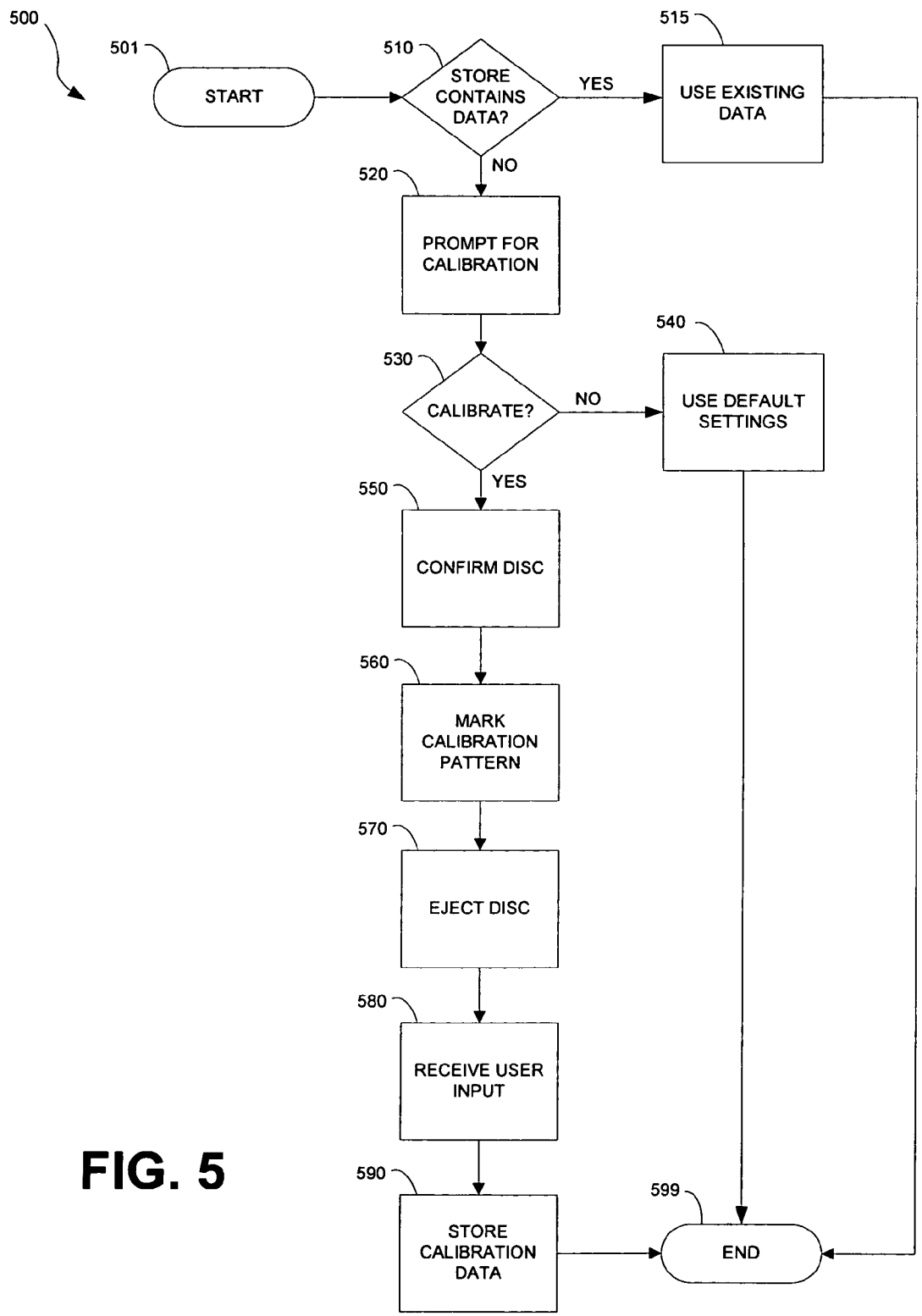
FIG. 5 is a flow chart of a method for focus calibration according to an embodiment of the present invention.

FIG. 5 shows a method 500 for focus calibration according to an embodiment of the present invention. The method 500 begins at start block 501, and proceeds to block 510. At block 510, a check is performed to determine whether or not the calibration data store 130 contains valid calibration data for a focus offset 340. In some alternative implementations, the determination is made by the controller 120. In other implementations, the determination is made by the computer 140 according to instructions in the calibration software 160.

If the check at block 510 indicates that valid calibration data has been stored, at block 515 the controller 120 uses existing calibration data in the calibration data store 130, and the method 500 may conclude at block 599. In some implementations, a recalibration may be requested by the controller 120, the computer 140, or the user 170, which may, in an illustrative example, occur automatically (e.g., after every fifty hours of disc label marking operation), or by request of the user 170 if information marked on a label side 206 no longer appears (to the user 170) sufficiently dark.

If the check at block 510 indicates that valid calibration data has not been stored, at block 520 the user 170 is prompted to do a calibration. In an illustrative example, the computer 140 may respond to instructions in the calibration software 160 by displaying a window (e.g., a dialog box) informing the user 170 that calibration is needed, and requesting that the user 170 grant or deny permission to proceed with the calibration (such as by displaying buttons labeled "OK" and "Cancel," respectively).

A check is performed at block 530 to determine whether the user 170 agrees to do a calibration. In an illustrative example, the user 170 may have signaled consent by responding to the prompt at block 520 with a mouse click on a button labeled "OK."

If the user 170 does not agree at block 530 to calibrate, then at block 540 the storage device 100 may default to settings that are designed to work adequately without calibration, and the method 500 concludes at block 599. If the user 170 agrees at block 530 to calibrate, the method 500 proceeds to block 550.

At block 550, it is confirmed (for example, by the controller 120) that a disc 202 is present in the drive mechanism 110 for writing a calibration pattern 400. If no disc 202 is in the drive mechanism 110, the user 170 may be prompted to insert the disc 202. The interaction with user 170 may, for example, be performed by the computer 140 according to instructions in the calibration software 160. In some implementations, the calibration software 160 may be designed to offer additional options to the user 170; for example, if a disc 202 already is in the drive mechanism 110, it may be desirable to confirm whether the user 170 actually wishes to write a calibration pattern 400 onto the disc 202 that is in the drive mechanism 110, or instead wishes to insert a different disc 202.

At block 560, the laser 216 marks a calibration pattern 400 on the label side 206 of the disc 202. For example, the calibration pattern 400 may include a test ring representing a focus offset 340 sweeping from a minimum to a maximum permissible working distance 330 from the disc 202, or a narrower range determined by the calibration software 160 within design parameters of the device 100. An exemplary minimum permissible working distance 330 may be determined so as to prevent physical contact between the disc 202 and any portion of the optics, such as the objective lens 214, or other hardware on the sled 218.

Exemplary calibration patterns 400 include those described in detail above with reference to FIG. 4A and FIG. 4B. An exemplary calibration pattern 400 may generally include two to twenty marked areas (such as marked areas 401-408 of FIG. 4A) representing solid fills produced at different focus offsets 340. For example, a typical calibration pattern 400 might include solid fill areas produced at a focus offset 340 of −60 μm, −50 μm, −40 μm, −30 μm, −20 μm, −10 μm, 0 μm, and +10 μm. Printing parameters such as linear velocity may in some embodiments be chosen so that a darker marked area 401-408 correlates directly to a faster effective printing speed.

At block 570, the disc 202 is ejected by the drive mechanism 110, so that the disc 202 may be inspected by the user 170.

At block 580, an input is received from the user 170. The user 170 selects a marked area, such as one of the marked areas 401-408, based on a visual assessment by the user 170. Typically, the user 170 would select a marked area from the set of marked areas that he/she perceives to be the darkest. The visual assessment may be subjective, but the ability of a typical user 170 to discriminate between marked areas 401-408 of varying darkness is generally sufficient to provide useful calibration data. The user 170 may then input the selection into the computer 140. In an illustrative example, the computer 140 may respond to instructions in the calibration software 160 by displaying a window informing the user 170 that an input value is needed to select a marked area. The instructions may further inform the user 170 that he/she should select the marked area that appears darkest and also request that the user 170 enter an input value identifying the selected marked area (such as by typing a number, letter, or descriptive string). After providing the input value, the user 170 may then confirm the entry (such as by a mouse click on a button labeled "OK"). Any of numerous alternate varieties of data entry and/or user interfaces may be used for receiving the input value from the user 170, such as radio buttons, a graphical display responsive to mouse clicks, and the like.

At block 590, the calibration data is stored. The calibration data may in some implementations include the input value of block 580, or may include values derived, identified, or calculated using the input value of block 580. For example, the calibration data may include the numeric value of the focus offset 340 at which the selected marked area was marked by laser beam 212. Continuing the illustrative example, the calibration software 160 may instruct the computer 140 to transmit the input value, or to transmit calibration data derived from the input value using the calibration software 160, to the controller 120, which stores the calibration data in the calibration data store 130. In some embodiments, the calibration software 160 may convert the received input value to an appropriate value or format for storage in the calibration data store 130, such as a value of focus offset 340. In other embodiments, the controller 120 may process the received input value according to instructions (such as may be found in firmware 232) for converting the received input value to an appropriate value or format for storage in the calibration data store 130, such as a value of focus offset 340. The device 100 may then use the calibration data for all subsequent printing on a label side 206 of a disc 202. The method 500 then concludes at block 599.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for calibration of a focus offset in an optical drive, comprising:
    marking a calibration pattern comprising a plurality of marked areas upon a medium,
    receiving a user input identifying a perceived darkest marked area of the calibration pattern, and
    determining the focus offset corresponding to the perceived darkest marked area.

2. The method of claim 1 wherein receiving a user input comprises prompting a user to perform a visual assessment of the calibration pattern.

3. The method of claim 1 further comprising:
    determining whether a calibration data store of the optical drive contains a calibration datum, and if so,
    determining the focus offset corresponding to the calibration datum.

4. The method of claim 3 further comprising:
    storing in the calibration data store a new calibration datum corresponding to the focus offset.

5. The method of claim 1 further comprising:
    determining whether the medium is present in the optical drive, and if not,
    prompting a user to insert the medium.

6. The method of claim 1 wherein the plurality of marked areas are arranged in an annular configuration.

7. The method of claim 1 wherein the plurality of marked areas are arranged in an arcuate configuration.

8. The method of claim 1 wherein the plurality of marked areas comprises a plurality of concentric annular arrangements of marked areas.

9. The method of claim 1 wherein the plurality of marked areas comprises a plurality of concentric arcuate arrangements of marked areas.

10. The method of claim 1 further comprising using the focus offset for marking of one or more label sides of a further one or more optical media in the optical drive.

11. The method of claim 1 further comprising ejecting the medium after marking the calibration pattern.

12. The method of claim 1 wherein each one of the plurality of marked areas comprises a tag for identifying the marked area to a calibration software application.

13. The method of claim 12 wherein the user input includes the tag for identifying the perceived darkest marked area.

14. An optical medium comprising a side having an optically marked calibration pattern having a plurality of optically marked areas, each optically marked area corresponding to a different focus offset value.

15. The optical medium of claim 14 wherein the side of the optical medium is a label side.

16. The optical medium of claim 14 wherein one or more of the plurality of areas comprises a solid fill pattern.

17. The optical medium of claim 14 wherein the plurality of focus offset values are in a range from −128 micrometers to +127 micrometers.

18. The optical medium of claim 14 wherein the plurality of focus offset values are in a range from about −100 micrometers to about +100 micrometers.

19. The optical medium of claim 14 wherein a darkest one of the plurality of areas is marked using a focus offset value within a range from about −29 micrometers to about −10 micrometers.

20. The optical medium of claim 14 wherein a darkest one of the plurality of areas is marked using a focus offset value within a range from about −10 micrometers to about +80 micrometers.

21. The optical medium of claim 14 wherein a first area from the plurality of areas comprises a tag for identifying the first area to a calibration software application.

22. The optical medium of claim 14 wherein each area from the plurality of areas includes a corresponding tag for permitting a user to identify the area to a computer running a calibration software application.

23. An optical storage device comprising:
    a mechanism able to focus an optical beam onto a surface of a medium within the optical storage device,
    a focus actuator mechanically coupled to the mechanism, the focus actuator being able to vary a working distance of the mechanism by a focus offset determined from a calibration datum, and
    a controller communicatively coupled to the focus actuator and to a data store for storing the calibration datum, the controller being adapted to cause the optical beam to mark a calibration pattern on the medium, and to obtain the calibration datum from a user input value corresponding to a user-selected marked area of the calibration pattern.

24. The optical storage device of claim 23 wherein the user-selected marked area is a perceived darkest marked area.

25. The optical storage device of claim 23 wherein the focus offset is an offset from an optimal focus position.

26. A computer-readable medium containing a set of instructions for calibrating a focus offset in an optical drive, the set of instructions comprising steps for:
    marking a calibration pattern comprising a plurality of marked areas upon a second medium,
    causing the optical drive to eject the second medium,
    receiving an input identifying a user-selected marked area of the calibration pattern, and
    determining the focus offset corresponding to the user-selected marked area.

27. The computer-readable medium of claim 26 wherein the second medium is an optical medium.

28. The computer-readable medium of claim 26 wherein the user-selected marked area is a perceived best marked area.

29. The computer-readable medium of claim 26 wherein the user-selected marked area is a perceived darkest marked area.

30. A computer-readable medium containing a set of instructions for calibrating a focus offset in an optical drive, the set of instructions comprising steps for:
    prompting the insertion of an optical medium into the optical drive,
    instructing the optical drive to mark a calibration pattern upon the optical medium,
    prompting a user to identify a darkest marked area of the calibration pattern,
    accepting a user input identifying a marked area of the calibration pattern, and
    transmitting a calibration datum to the optical drive.

31. The computer-readable medium of claim 30 wherein the calibration pattern comprises a plurality of marked areas.

32. The computer-readable medium of claim 30 wherein the calibration datum comprises the input.

33. The computer-readable medium of claim 30, the set of instructions further comprising steps for:
    deriving a focus offset value from the input, and
    determining a calibration datum comprising the focus offset value.

34. A calibration system comprising:
means for marking a calibration pattern comprising a plurality of marked areas upon a medium,
means for receiving a user input identifying a marked area of the calibration pattern, and
means for determining a focus offset corresponding to the marked area.

35. The calibration system of claim 34 further comprising means for prompting a user to visually assess the calibration pattern.

36. The calibration system of claim 34 further comprising means for prompting a user to select a user-perceived darkest marked area of the calibration pattern.

37. The calibration system of claim 36 wherein the marked area is a user-perceived darkest marked area.

38. The calibration system of claim 34, wherein the medium is an optical medium used to store electronic data.

* * * * *